US012604278B2

(12) United States Patent
Dasgupta

(10) Patent No.: US 12,604,278 B2
(45) Date of Patent: Apr. 14, 2026

(54) 5G INTER- AND INTRA-NETWORK NODE COORDINATION FOR POWER CONSUMPTION OPTIMIZATION AND REDUCTION

(71) Applicant: Cisco Technology, Inc., San Jose, CA (US)

(72) Inventor: Sukrit Dasgupta, Norfolk, MA (US)

(73) Assignee: Cisco Technology, Inc., San Jose, CA (US)

( * ) Notice: Subject to any disclaimer, the term of this patent is extended or adjusted under 35 U.S.C. 154(b) by 514 days.

(21) Appl. No.: 18/324,528

(22) Filed: May 26, 2023

(65) Prior Publication Data

US 2024/0397441 A1 Nov. 28, 2024

(51) Int. Cl.
*H04W 52/28* (2009.01)
*H04W 8/02* (2009.01)
*H04W 52/02* (2009.01)

(52) U.S. Cl.
CPC .......... *H04W 52/285* (2013.01); *H04W 8/02* (2013.01); *H04W 52/0203* (2013.01)

(58) Field of Classification Search
None
See application file for complete search history.

(56) References Cited

U.S. PATENT DOCUMENTS

| | | | | |
|---|---|---|---|---|
| 12,199,812 B2 * | 1/2025 | Pick | .......................... | H04L 41/16 |
| 2020/0012748 A1 * | 1/2020 | Ganesan | .............. | H04B 17/391 |

| | | | | |
|---|---|---|---|---|
| 2022/0086716 A1 | 3/2022 | Byun et al. | | |
| 2022/0182928 A1 | 6/2022 | Awoniyi-Oteri et al. | | |
| 2022/0286235 A1 | 9/2022 | Ranta-Aho et al. | | |
| 2023/0127116 A1 * | 4/2023 | Nanda | .................... | H04W 24/04 |
| | | | | 455/422.1 |
| 2024/0089168 A1 * | 3/2024 | Boone | ................. | H04L 41/0686 |
| 2024/0223458 A1 * | 7/2024 | Singh | .................... | H04L 41/147 |
| 2024/0414579 A1 * | 12/2024 | Zhao | ..................... | H04W 24/04 |

FOREIGN PATENT DOCUMENTS

| | | | | |
|---|---|---|---|---|
| CN | 113055903 | 6/2021 | | |
| CN | 115484042 A * | 12/2022 | ......... | H04L 63/1416 |
| EP | 4266764 A1 * | 10/2023 | ........ | H04W 52/0216 |
| EP | 4274177 A1 * | 11/2023 | ............. | H04L 41/14 |
| WO | 2021239238 | 12/2021 | | |
| WO | WO-2024149469 A1 * | 7/2024 | ............ | H04W 24/04 |

OTHER PUBLICATIONS

Nicola Piovesan et al., "Machine Learning and Analytical Power Consumption Models for 5G Base Stations," arXiv.org, Sep. 23, 2022, pp. 1-7.

* cited by examiner

*Primary Examiner* — Mohammed Rachedine
(74) *Attorney, Agent, or Firm* — Polsinelli P.C.

(57) ABSTRACT

Association and mobility patterns corresponding to client devices within a 5G network are tracked in real-time. A machine learning model is trained to identify, based on these patterns, periods of time for powering down one or more 5G nodes within the 5G network. The machine learning model, based on these periods of time, generates a set of power saving profiles that are used to automatically define power saving modes for the one or more 5G nodes. The machine learning model is updated according to changes to the association and mobility patterns resulting from the power saving modes.

20 Claims, 9 Drawing Sheets

400

TRACK CONNECTIVITY, ASSOCIATION, AND TRANSMISSION TIMES
FOR STATIC AND MOBILE DEVICE(S) CONNECTED TO NODE — 402

GENERATE DEVICE PROFILE(S) CORRESPONDING TO DEVICE(S) — 404

IDENTIFY ASSOCIATION PATTERN(S) FOR THE STATIC AND MOBILE DEVICE(S) CONNECTED
TO NODE — 406

TRANSMIT TIME SERIES DATA CORRESPONDING TO ASSOCIATION PATTERN(S) TO
CENTRAL ANALYTICS ENGINE — 408

500

OBTAIN ASSOCIATION PATTERN(S) ASSOCIATED WITH CLIENT DEVICE(S) FOR DIFFERENT NODE(S) — 502

GENERATE TIME SERIES PATTERN(S) CORRESPONDING TO OBTAINED ASSOCIATION PATTERN(S) — 504

IDENTIFY MOBILITY PATTERN(S) FOR CLIENT DEVICE(S) BASED ON TIME SERIES PATTERN(S) — 506

TRANSMIT MOBILITY PATTERN(S) TO CENTRAL ANALYTICS ENGINE — 508

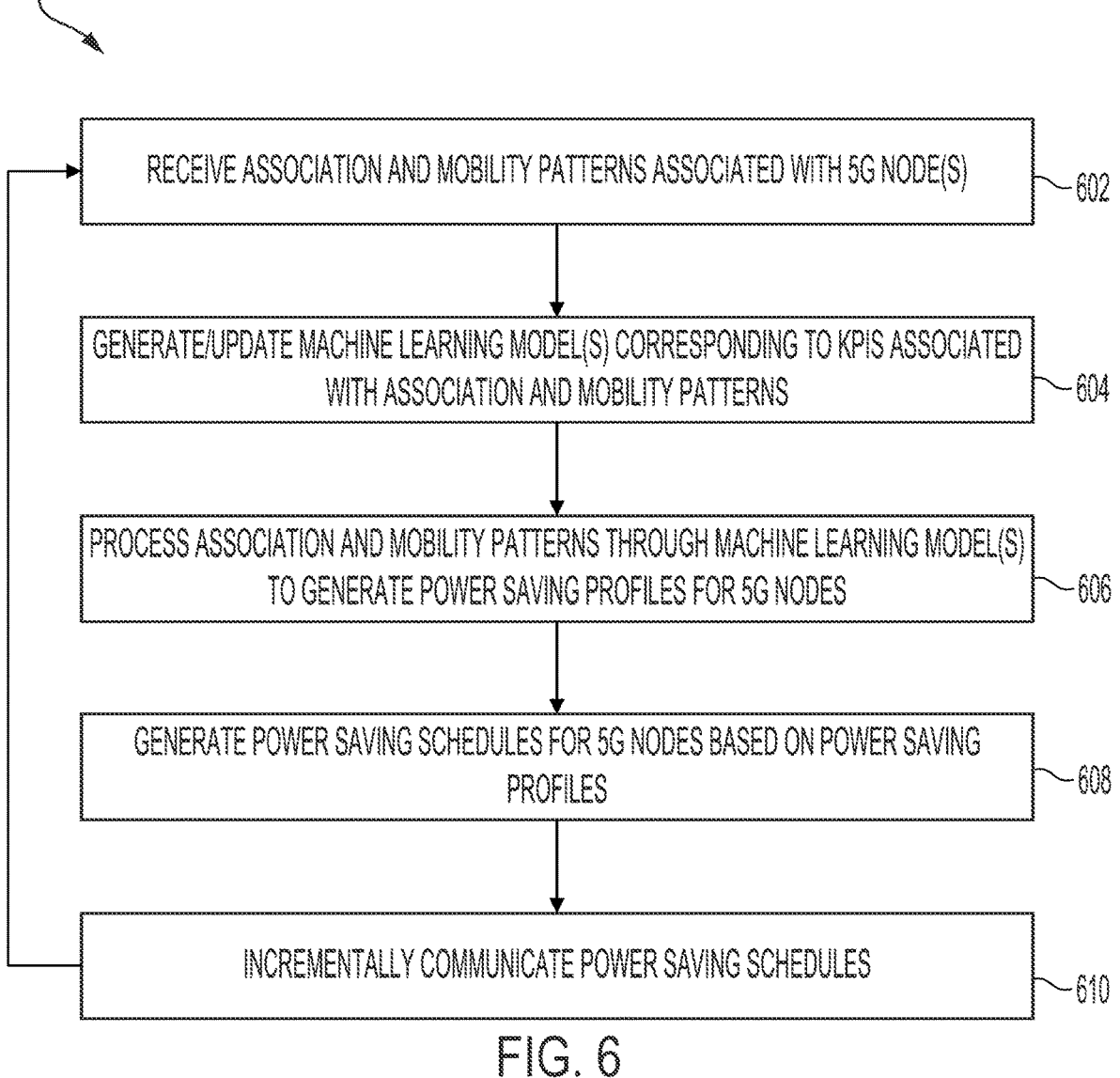

600

RECEIVE ASSOCIATION AND MOBILITY PATTERNS ASSOCIATED WITH 5G NODE(S) — 602

GENERATE/UPDATE MACHINE LEARNING MODEL(S) CORRESPONDING TO KPIS ASSOCIATED WITH ASSOCIATION AND MOBILITY PATTERNS — 604

PROCESS ASSOCIATION AND MOBILITY PATTERNS THROUGH MACHINE LEARNING MODEL(S) TO GENERATE POWER SAVING PROFILES FOR 5G NODES — 606

GENERATE POWER SAVING SCHEDULES FOR 5G NODES BASED ON POWER SAVING PROFILES — 608

INCREMENTALLY COMMUNICATE POWER SAVING SCHEDULES — 610

RECEIVE POWER SAVING SCHEDULES GENERATED BY DIFFERENT CENTRAL ANALYTICS ENGINE(S) ASSOCIATED WITH DIFFERENT 5G CELLS — 702

CORRELATE POWER SAVING SCHEDULES WITH ROAMING PATTERN(S) OF CLIENT DEVICE(S) AMONGST 5G CELLS — 704

IDENTIFY TIME PERIOD(S) FOR MAINTAINING 5G NODE(S) IN POWERED DOWN STATE — 706

PERFORM COORDINATION ACROSS 5G CELLS ACCORDING TO IDENTIFIED TIME PERIOD(S) — 708

5G INTER- AND INTRA-NETWORK NODE COORDINATION FOR POWER CONSUMPTION OPTIMIZATION AND REDUCTION

TECHNICAL FIELD

The present disclosure generally relates to the field of computer networking, particularly with regard to the optimization and reduction of power consumption amongst nodes within fifth-generation (5G) networks.

BACKGROUND

The proliferation of broadband cellular networks, such as 5G mobile networks, has led to an increase in network speed, reduced latency, and improved flexibility of wireless services. 5G mobile networks are often implemented with power optimization mechanisms that can cause 5G transmitters to automatically power down when no data is being transmitted by these 5G transmitters in order to improve power consumption. However, as a result of the increase in the usage of 5G mobile networks, these 5G mobile networks can have complex data usage patterns that may require coordination and advanced analytics to identify period of time when power consumption can be reduced.

Adding to this complexity, as 5G mobile networks become more pervasive, cells from different 5G mobile networks can overlap and, at the same time, client devices are able to detect these different 5G mobile networks. During period of reduced transmissions, it may not be necessary for all 5G mobile network stations to be consuming power if only a subset of these stations can service client devices. Thus, there is a need for coordination within 5G mobile network architectures to optimize and reduce power consumption amongst different transmitters within these 5G mobile networks.

BRIEF DESCRIPTION OF THE FIGURES

To provide a more complete understanding of the present disclosure and features and advantages thereof, reference is made to the following description, taken in conjunction with the accompanying drawings, in which:

FIG. 6 shows an illustrative example of a process for generating and communicating a set of power saving schedules for different 5G nodes based on received association and mobility patterns across a 5G mobile network in accordance with at least one embodiment;

DETAILED DESCRIPTION

Figure 1:
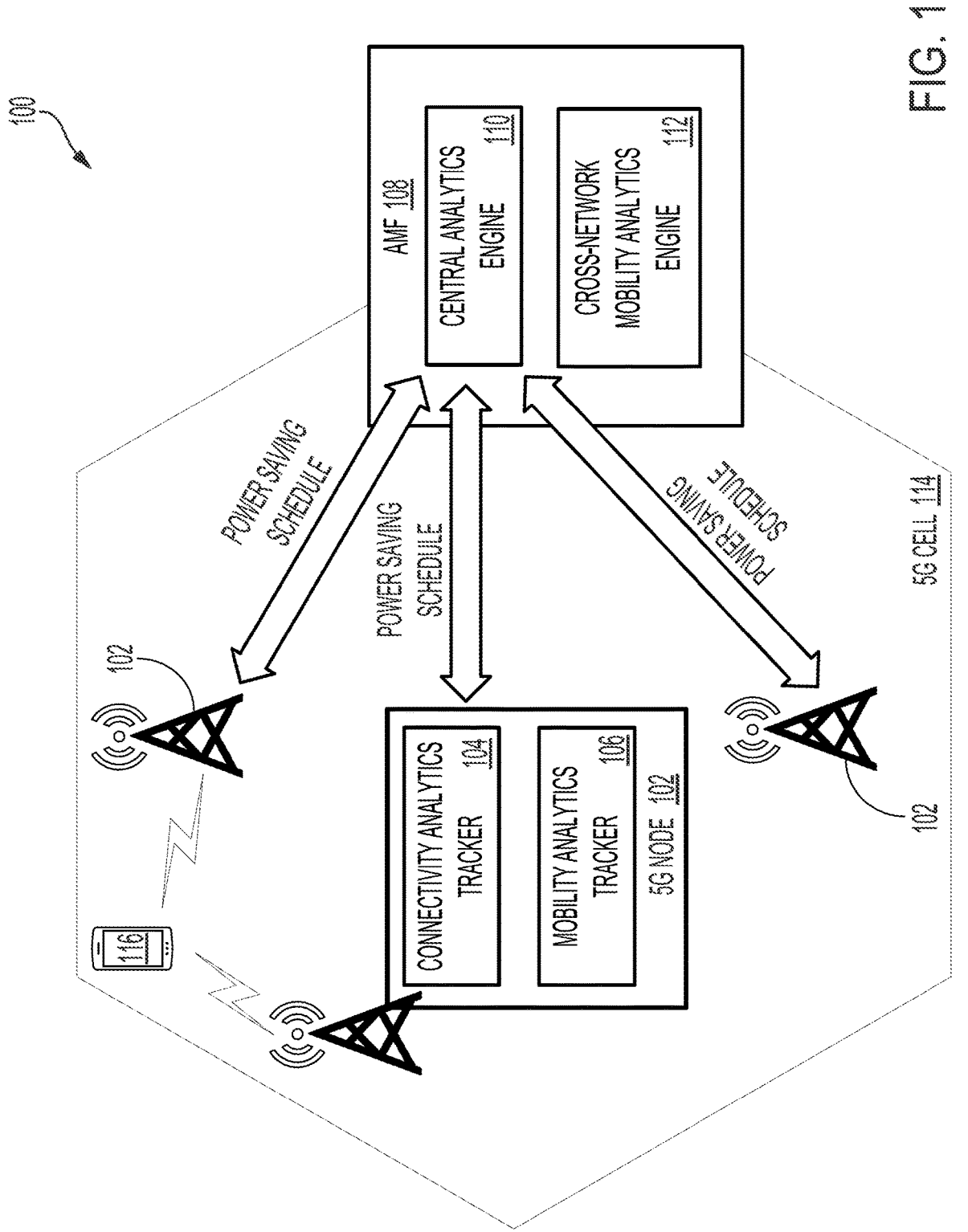
FIG. 1 shows an illustrative example of an environment in which a central analytics engine implemented as part of the Access and Mobility Management Function (AMF) of a 5G core network dynamically processes association and mobility patterns corresponding to client devices connected to different 5G nodes to define power saving schedules for the 5G nodes in accordance with at least one embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for 5G node coordination to determine which transmitters within a 5G mobile network can remain powered down while the 5G mobile network continues to service end client devices without any network disruptions.

In an example, a computer-implemented method comprises continuously monitoring association patterns corresponding to a set of client devices within a 5G network. The 5G network includes a set of 5G nodes. Further, the association patterns denote changes to associations between the set of client devices and the set of 5G nodes. The computer-implemented method further comprises tracking mobility patterns in the 5G network across the set of 5G nodes and the set of client devices. The mobility patterns are tracked based on the association patterns. The computer-implemented method further comprises dynamically training a machine learning model to identify periods of time for powering down one or more 5G nodes of the set of 5G nodes. This machine learning model is dynamically trained based on historical telemetry data associated with the 5G network. The computer-implemented method further comprises generating a set of power saving profiles for the set of 5G nodes. The set of power saving profiles are generated using the association patterns and the mobility patterns as input to the machine learning model. The computer-implemented method further comprises automatically defining power saving modes for the set of 5G nodes. The power saving modes are implemented according to the set of power saving profiles. The computer-implemented method further comprises updating the machine learning model according to changes to the association patterns and the mobility patterns resulting from the power saving modes.

In an example, the computer-implemented method further comprises generating a set of profiles corresponding to the set of client devices. The set of profiles are generated based on the association patterns. The computer-implemented method further comprises updating the historical telemetry data to include the set of profiles to dynamically train the machine learning model.

In an example, the mobility patterns include time series patterns that track different association patterns corresponding to a client device with different 5G nodes within the 5G network.

In an example, the computer-implemented method further comprises receiving a set of power saving schedules associated with one or more other 5G networks. The the one or more other 5G networks provide overlapping network coverage with the 5G network. The computer-implemented method further comprises determining time periods during which a subset of the set of 5G nodes are powered down and serviced by the one or more other 5G networks.

In an example, the computer-implemented method further comprises reducing power consumption for a set of higher transmit power frequencies as a result of a determination that the set of client devices can remain connected to the 5G network through a set of lower transmit power frequencies. The determination is generated based on the association patterns and the mobility patterns.

In an example, the set of power saving profiles define period of time when the set of 5G nodes are not servicing any client devices and can be powered down.

In an example, automatically defining the power saving modes for the set of 5G nodes includes generating schedules for the set of 5G nodes to enter the power saving modes and incrementally communicating the schedules to the set of 5G nodes. The schedules are incrementally communicated to limit network disruption amongst the set of client devices.

In an example, a system comprises one or more processors and memory storing thereon instructions that, as a result of being executed by the one or more processors, cause the system to continuously monitor association patterns corresponding to a set of client devices within a 5G network. As noted above, the 5G network includes a set of 5G nodes. Further, wherein the association patterns denote changes to associations between the set of client devices and the set of 5G nodes. The instructions further cause the system to track mobility patterns in the 5G network across the set of 5G nodes and the set of client devices. The mobility patterns are tracked based on the association patterns. The instructions further cause the system to dynamically train a machine learning model to identify periods of time for powering down one or more 5G nodes of the set of 5G nodes. The machine learning model is dynamically trained based on historical telemetry data associated with the 5G network. The instructions further cause the system to generate a set of power saving profiles for the set of 5G nodes. The set of power saving profiles are generated using the association patterns and the mobility patterns as input to the machine learning model. The instructions further cause the system to automatically define power saving modes for the set of 5G nodes. The power saving modes are implemented according to the set of power saving profiles. The instructions further cause the system to update the machine learning model according to changes to the association patterns and the mobility patterns resulting from the power saving modes.

In an example, a non-transitory computer-readable storage medium stores thereon executable instructions that, as a result of being executed by one or more processors of a computer system, cause the computer system to continuously monitor association patterns corresponding to a set of client devices within a 5G network. As noted above, the 5G network includes a set of 5G nodes. Further, wherein the association patterns denote changes to associations between the set of client devices and the set of 5G nodes. The executable instructions further cause the computer system to track mobility patterns in the 5G network across the set of 5G nodes and the set of client devices. The mobility patterns are tracked based on the association patterns. The executable instructions further cause the computer system to dynamically train a machine learning model to identify periods of time for powering down one or more 5G nodes of the set of 5G nodes. The machine learning model is dynamically trained based on historical telemetry data associated with the 5G network. The executable instructions further cause the computer system to generate a set of power saving profiles for the set of 5G nodes. The set of power saving profiles are generated using the association patterns and the mobility patterns as input to the machine learning model. The executable instructions further cause the computer system to automatically define power saving modes for the set of 5G nodes. The power saving modes are implemented according to the set of power saving profiles. The executable instructions further cause the computer system to update the machine learning model according to changes to the association patterns and the mobility patterns resulting from the power saving modes.

Description of Example Embodiments

Figure 8:
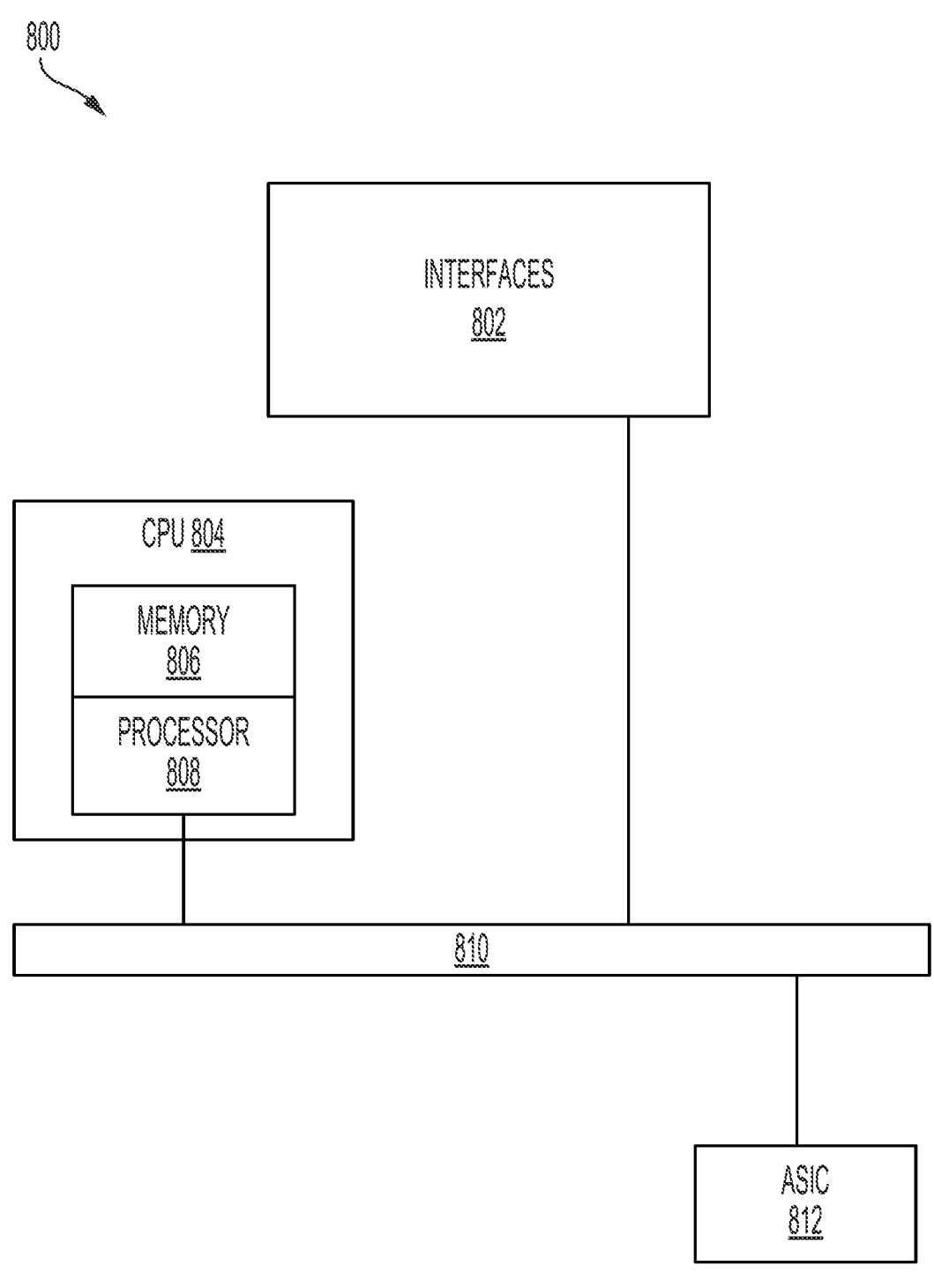
FIG. 8 illustrates an example network device suitable for performing switching, routing, and other networking operations in accordance with some embodiments.
Figure 9:
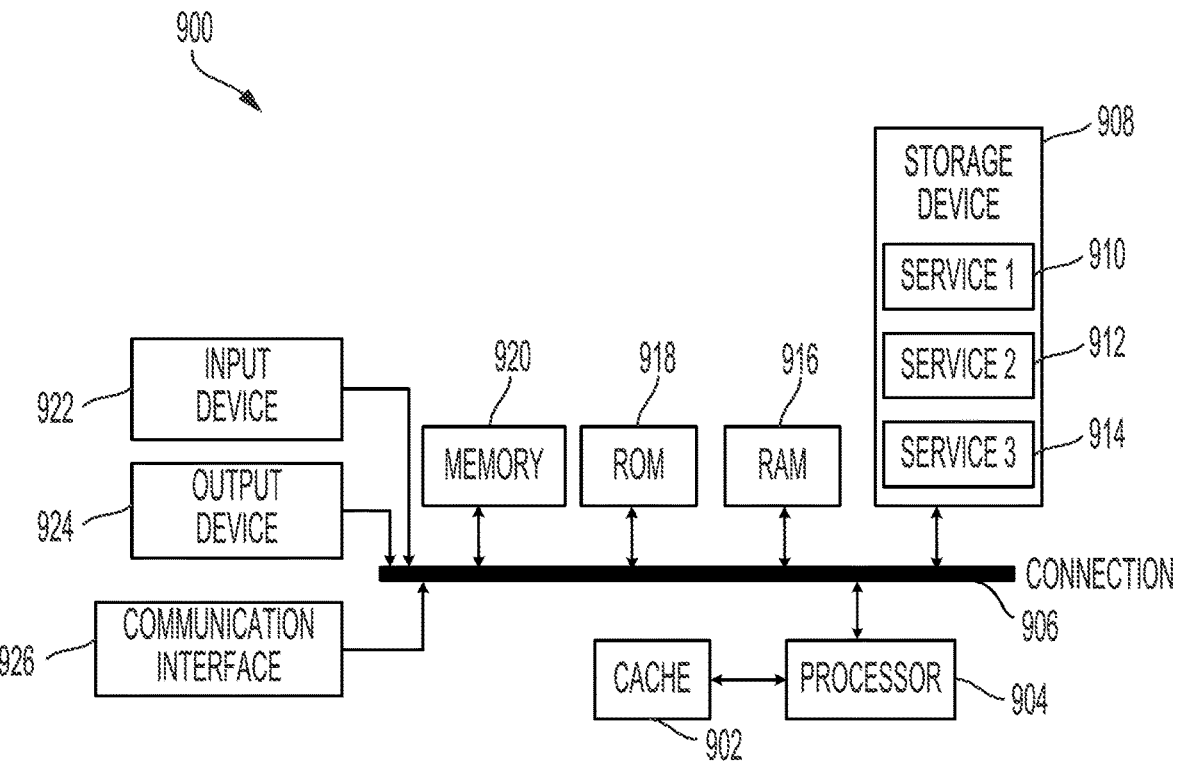
FIG. 9 illustrates a computing system architecture including various components in electrical communication with each other using a connection in accordance with some embodiments.

Disclosed herein are systems, methods and computer-readable storage media for 5G node coordination to determine which transmitters within a 5G mobile network can remain powered down while the 5G mobile network continues to service end client devices without any network disruptions. The present technologies will be described in more detail in the following disclosure as follows. The discussion begins with a detailed description of example systems, processes and environments for 5G node coordination to determine which transmitters within a 5G mobile network can remain powered down while the 5G mobile network continues to service end client devices without any network disruptions, as illustrated in FIGS. 1 through 7. The discussion concludes with a description of an example network and computing devices, as illustrated in FIGS. 8 and 9.

FIG. 1 shows an illustrative example of an environment 100 in which a central analytics engine 110 implemented as part of the Access and Mobility Management Function (AMF) 108 of a 5G core network dynamically processes association and mobility patterns corresponding to client devices 116 connected to different 5G nodes 102 to define power saving schedules for the 5G nodes 102 in accordance with at least one embodiment. In the environment 100, a 5G mobile network includes a 5G cell 114 comprising a set of different radio access nodes (RANs) 102 that may collectively provide targeted network coverage within a particular area (e.g., geographic region, neighborhood, urban center, etc.).

In an embodiment, the RANs 102 within the 5G cell 114 are managed by an AMF 108 of the 5G core network. The AMF 108 is a control plane function in the 5G core network and performs, for the 5G cell 114, connection and management mobility tasks. In some instances, the AMF 108 may further provide power optimization for the RANs 102, whereby when no data is transmitted by a particular RAN 102, the RAN 102 may be powered down in order to improve its power consumption. However, as noted above, the 5G mobile network may have complex data usage patterns, which can make it difficult to identify the appropriate periods of time during which different RANs may be powered down in order to provide network-wide power consumption reductions.

In an embodiment, each RAN 102 within the 5G cell 114 implements a connectivity analytics tracker 104 that is configured to track association patterns of all client devices 116 within the 5G mobile network. The connectivity analytics tracker 104 may be implemented within the base station of the RAN 102 to automatically monitor client device interactions with the RAN 102. For instance, the connectivity analytics tracker 104 may be implemented as an application or other executable process executed on one or more systems associated with the base station of the RAN 102. In an embodiment, the connectivity analytics tracker 104 tracks the association patterns of a client device 116 with the RAN 102 to identify how the associations for the client device 116 change over time. The connectivity analytics tracker 104 can track association patterns for different types of client devices 116. For instance, the connectivity analytics tracker 104 may monitor and track association patterns for mobile client devices (e.g., mobile cellular devices, etc.) and static client devices (e.g., servers, static Internet-of-Things (IoT) devices, etc.).

In an embodiment, the connectivity analytics tracker 104 can additionally, or alternatively, process connectivity data for myriad client devices 116 in real-time to generate statistics corresponding to the connectivity, association, and transmission times for these client devices 116. Through the generation of these statistics for each client device 116, the connectivity analytics tracker 104 may generate client device profiles that may be used to define the association patterns of each client device 116. For instance, a client device profile generated by the connectivity analytics tracker 104 may indicate how long a client device 116 is transmitting through the RAN 102, how long the client device 116 is associated with the RAN 102, and/or how long the client device 116 is associated with the RAN 102 but is not engaged in any activity through the RAN 102.

In an embodiment, the connectivity analytics tracker 104 can additionally, or alternatively, track the state of the RAN 102 itself. For instance, the connectivity analytics tracker 104 may automatically, and in real-time, generate association patterns for the RAN 102, which may indicate how many client devices 116 are associated with the RAN 102, the involvement of the RAN 102 in the transmission of data corresponding to these client devices 116, the length of time for identified inactive periods for the RAN 102, and the like.

The connectivity analytics tracker 104, in an embodiment, continuously tracks, in real-time, the aforementioned metrics for the client devices 116 and the RAN 102 itself to generate time series data over extended periods of time. As this time series data is generated by the connectivity analytics tracker 104, the connectivity analytics tracker 104 may automatically transmit the time series data to the AMF 108. As described in greater detail herein, this time series data may be used by a central analytics engine 110 implemented by the AMF 108 to dynamically generate and train one or more machine learning models that are implemented to dynamically generate power saving schedules for the different RANs 102 within the 5G cell 114.

In addition to implementing a connectivity analytics tracker 104 for defining association patterns for different client devices 116, the RAN 102 may further implement a mobility analytics tracker 106 that is configured to track mobility patterns in the 5G mobile network on a per-client basis. The mobility analytics tracker 106 may be implemented within the base station of the RAN 102 to automatically generate telemetry data for different client devices 116 along different RANs 102. For instance, the mobility analytics tracker 106 may be implemented as an application or other executable process executed on one or more systems associated with the base station of the RAN 102.

In an embodiment, the mobility analytics tracker 106 automatically generates, in real-time, time series patterns corresponding to the complete association patterns of a client device 116 with different RANs 102 within the 5G cell 114. For instance, as a client device 116 moves within a 5G cell 114, the client device 116 may be handed over from a first RAN to a second RAN within the 5G cell 114. These handover events may be tracked by a RAN 102 through a handover procedure. Through this handover procedure, the target RAN 102 may receive an indication from the source RAN regarding the client device's movement into the range of the target RAN 102, thereby ensuring uninterrupted network access for the client device 116. Similarly, when a client device 116 is handed over to another RAN within the 5G cell 114 or any other 5G cell associated with the 5G mobile network or other network, the RAN 102 may receive an indication of the target RAN that the client device 116 is being handed over to. Accordingly, the RAN 102 may track a client device's mobility within the 5G mobile network as the client device 116 becomes associated and disassociated with the RAN 102.

In an embodiment, the mobility analytics tracker 106 maintains dedicated graphs on a per-device basis to track the location of the client device 116 in relation to the RAN 102 topology. In some instances, the mobility analytics tracker 106 may track the mobility metrics corresponding to client device movements within the 5G mobile network from the perspective of the RAN 102 itself. For example, the mobility analytics tracker 106 may track how many client devices have roamed out of range of the RAN 102. Further, the mobility analytics tracker 106 may track how many client devices have roamed into range of the RAN 102. As these client devices roam in and out of range of the RAN 102, the mobility analytics tracker 106 may determine the transmission patterns of these client devices during their respective roaming phases.

Similar to the connectivity analytics tracker 104 described above, as the mobility analytics tracker 106 generates mobility patterns and other metrics on a per-device basis for the myriad client devices accessing the RAN 102 and other RANs within the 5G cell 114, the mobility analytics tracker 106 may automatically transmit these mobility patterns and other metrics to the AMF 108. As described in greater detail herein, this time series data may be used by a central analytics engine 110 implemented by the AMF 108 to dynamically generate and train one or more machine learning models that are implemented to dynamically generate power saving schedules for the different RANs 102 within the 5G cell 114.

It should be noted that while the connectivity analytics tracker 104 and the mobility analytics tracker 106 are described extensively throughout the present disclosure as being implemented within RANs 102, in some embodiments, the connectivity analytics tracker 104 and the mobility analytics tracker 106 can be implemented within the AMF 108. In such embodiments, the AMF 108 automatically obtains raw association and mobility data from each of the RANs 102 within the 5G cell 114 and, through the aforementioned connectivity analytics tracker 104 and the mobility analytics tracker 106, may generate the association and mobility patterns corresponding to the client devices 116 and the RANs 102 themselves. Such an implementation of the connectivity analytics tracker 104 and the mobility analytics tracker 106 may allow for consolidated data collection and processing within the AMF 108 for generating the power saving schedules for the RANs 102, as described in greater detail herein.

As noted above, the AMF 108 may implement a central analytics engine 110, which may continuously, and in real-time, receive data streams from the connectivity analytics tracker 104 and the mobility analytics tracker 106 implemented by each RAN 102 within the 5G cell 114. The central analytics engine 110 may be implemented as an application or other executable process executed on one or more systems associated with the AMF 108 within the control plane of the 5G mobile network. In an embodiment, the central analytics engine 110 generates machine learning models for the key performance indicators (KPIs) that are being streamed from the connectivity analytics tracker 104 and the mobility analytics tracker 106 implemented by each RAN 102 within the 5G cell 114. The machine learning models generated by the central analytics engine 110 may be dynamically trained using unsupervised training methods. For instance, a dataset of sample association and mobility patterns corresponding to different client devices and RANs (e.g., historical association and mobility patterns, hypothetical association and mobility patterns, etc.) and corresponding power saving profiles and schedules for the RANs may be analyzed using a clustering or classification algorithm to identify an appropriate power saving schedule for each RAN according to the input association and mobility patterns for a particular time series. For instance, the machine learning model may be dynamically trained in real-time by processing the sample association and mobility patterns corresponding to different client devices and RANs according to one or more vectors of similarity between the sample dataset and other clusters corresponding to different power saving schedule types (e.g., different power saving patterns over a period of time, etc.). Thus, in some embodiments, the central analytics engine 110, through the machine learning model, can perform such clustering and obtain partial matches among other clusters of association and mobility patterns to identify a particular cluster and, from this cluster, identify a power saving schedule that may be implemented for a corresponding RAN 102. Example clustering algorithms that may be trained using this dataset may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like.

In an embodiment, the central analytics engine 110 can further use a set of heuristics or static thresholds to determine periods of time when the RANs 102 within the 5G cell 114 may be powered down. For instance, the central analytics engine 110 may evaluate, in real-time, the association and mobility patterns corresponding to a RAN 102 to identify periods of time during which power consumption for the RAN 102 is below a threshold value. If the power consumption for these periods of time falls below the threshold value, the central analytics engine 110 may determine that the RAN 102 may be powered down during these periods of time. Using the aforementioned heuristics, the central analytics engine 110 may further calculate future periods of time during which it is predicted that power consumption will be below this threshold value. Based on these identified periods of time, the central analytics engine 110 may construct a power saving schedule for the RAN 102, which may be implemented to cause the RAN 102 to reduce or shut down its power consumption during the identified periods of time.

In an embodiment, the central analytics engine 110 can determine period of time when a RAN 102 can be shut down or have its power consumption reduced regardless of whether there is a historical trend of servicing client devices 116. For instance, if the central analytics engine 110 determines, using the aforementioned machine learning models, that based on the historical roaming and association patterns associated with a set of client devices 116, other neighboring RANs can continue to service this same set of client devices 116, the central analytics engine 110 may determine that the RAN 102 can be shut down or have its power consumption reduced for the identified one or more periods of time.

In an embodiment, the central analytics engine 110 can further identify, for each RAN 102, any transmission frequencies that require more power consumption but for which other frequencies requiring less power consumption may be used to provide network connectivity for client devices 116 within the 5G mobile network. For instance, a RAN 102 implementing an interface according to the 5G New Radio (5G NR) standard may support multiple frequency bands, such as sub-6 GHz bands, millimeter wave (mmWave) bands, and the like. The central analytics engine 110, using the aforementioned machine learning models, may evaluate the association and mobility patterns for each of the client devices 116 and for each of the RANs 102 according to these multiple frequency bands to determine whether certain transmission frequencies requiring lower power consumption may be used in place of current transmission frequencies currently being utilized for data transmissions associated with these client devices 116. This determination may be made, for instance, based on the transmission and/or performance requirements of these client devices 116.

In an embodiment, the central analytics engine 110, using the aforementioned machine learning models, continuously computes power saving profiles for each of the RANs 102 within the 5G cell 114 based on the streamed association and mobility patterns provided by their corresponding connectivity analytics tracker 104 and mobility analytics tracker 106. Based on these power saving profiles, the central analytics engine 110 may generate corresponding power saving schedules for each of the RANs 102. The power saving schedules may indicate periods of time during which power consumption for each of the RANs 102 may be reduced or otherwise shut down in order to optimize power consumption within the 5G cell 114 as a whole. As these power saving schedules are defined, the central analytics engine 110 may incrementally transmit these power saving schedules to the various RANs 102 in the 5G cell 114 in order to reduce or prevent any network disruptions within the 5G cell 114 that may impact the client devices 116.

As noted above, the central analytics engine 110 may continuously, and in real-time, receive association and mobility patterns from the different RANs 102 within the 5G cell 114. Thus, as new association and mobility patterns are received, the central analytics engine 110 may process these new association and mobility patterns to detect any changes that, in turn, may result in changes to the power saving profiles and corresponding schedules for the RANs 102. Thus, as new association and mobility patterns are received, these new association and mobility patterns may be used to evaluate the previously generated machine learning models and determine whether the machine learning models should be updated to provide more accurate results. For instance, if a previously generated set of power saving schedules did not result in reduced power consumption for the 5G cell 114 as a whole, the machine learning models may be updated using the new association and mobility patterns to perform a re-clustering of these machine learning models and/or an update to the corresponding vectors of similarity in order to more accurately define power saving schedules for the RANs 102.

In an embodiment, the AMF 108 further implements a cross-network mobility analytics engine 112 that is configured to coordinate between central analytics engine components from other network providers and the central analytics engine 110 to further optimize power consumption for the 5G cell 114. These other network providers may provide overlapping network coverage with the 5G cell 114, whereby either the 5G cell 114 or one or more cells associated with these other network providers may provide network connectivity for client devices 116. As a result of this overlapping coverage, there may be opportunities to optimize power consumption across different 5G mobility networks. The cross-network mobility analytics engine 112 may be implemented as an application or other executable process executed on one or more systems associated with the AMF 108 within the control plane of the 5G mobile network. The cross-network mobility analytics engine 112 may communicate with different central analytics engines associated with private 5G as a Service (5GaaS) network providers and/or public 5G network providers.

In an embodiment, the cross-network mobility analytics engine 112 receives the different power saving schedules generated by the different central analytics engines corresponding to the different overlapping 5G mobile networks and by the central analytics engine 110 described above. As the cross-network mobility analytics engine 112 obtains these power saving schedules, the cross-network mobility analytics engine 112 may correlate these power saving schedules with the roaming patterns of the client devices 116 that are roaming between the different 5G mobile network providers. For instance, the cross-network mobility analytics engine 112 may identify any overlapping RANs corresponding to the 5G cell 114 and other cells associated with different 5G mobile network providers. For these overlapping RANs, the cross-network mobility analytics engine 112 may process their corresponding power saving schedules to identify any periods of time during which the RANs within the 5G cell 114 can remain powered down or at a reduced power consumption state as a result of overlapping RANs associated with different 5G mobile networks being able to service the client devices 116 within range of the RANs within the 5G cell 114.

As each 5G network provider may implement their own cross-network mobility analytics engine within their corresponding AMFs, the cross-network mobility analytics engine 112 implemented by the AMF 108 may perform a coordination process across the different 5G mobile networks implemented by the other 5G network providers to optimize roaming in relation to overall power consumption. For example, roaming profiles for the 5G mobile network associated with the AMF 108 and the other 5G mobile networks can be shared amongst the different 5G network providers such that roaming may be performed at a different time into another 5G mobile network if the resulting impact includes maintaining RANs 102 within the original 5G mobile network in a powered off state, thereby reducing power consumption across all 5G mobile networks.

Figure 2:
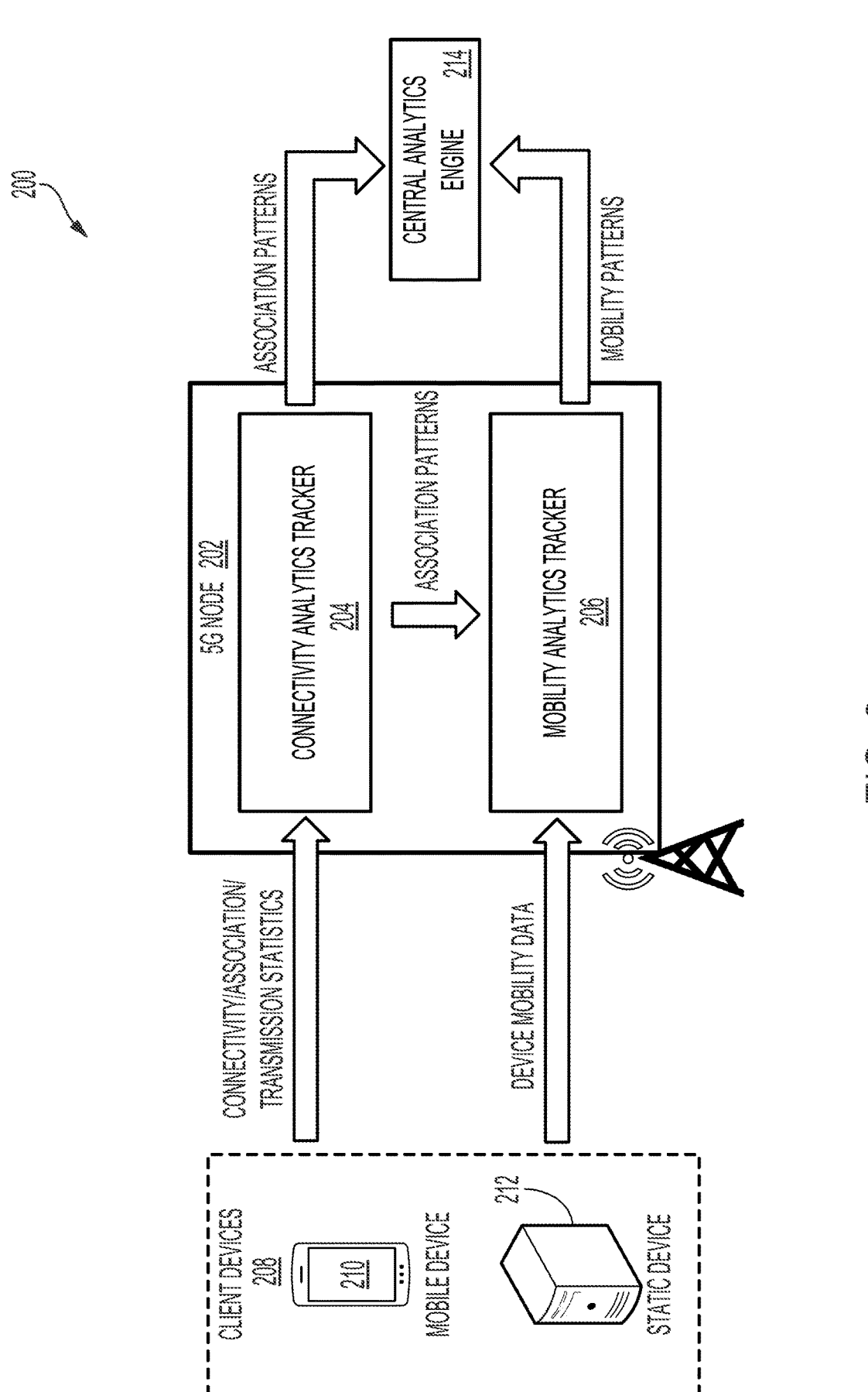
FIG. 2 shows an illustrative example of an environment in which a 5G node implements a connectivity analytics tracker and a mobility analytics tracker configured to identify association and mobility patterns, respectively, for different client devices in accordance with at least one embodiment.

FIG. 2 shows an illustrative example of an environment 200 in which a 5G node 202 (e.g., a RAN) implements a connectivity analytics tracker 204 and a mobility analytics tracker 206 configured to identify association and mobility patterns, respectively, for different client devices 208 in accordance with at least one embodiment. The connectivity analytics tracker 204 and the mobility analytics tracker 206 may be similar to the connectivity analytics tracker 104 and the mobility analytics tracker 106 described above in connection with FIG. 1. For instance, in the environment 200, the connectivity analytics tracker 204 may track the association patterns of different client devices 208, including mobile client devices 210 and static client devices 212, with the RAN 202 to identify how the associations for these client device 208 change over time. Additionally, or alternatively, the connectivity analytics tracker 204 may generate client device profiles for each of the client devices 208 by processing connectivity data for the client devices 208 in real-time to generate statistics corresponding to the connectivity, association, and transmission times for these client devices 208. The connectivity analytics tracker 204 may further track the state of the RAN 202 itself, as described above.

Using the data collected from the myriad client devices 208 and for the RAN 202 itself, the connectivity analytics tracker 204 may generate time series data over extended periods of time and corresponding to the aforementioned metrics. As noted above, as the connectivity analytics tracker 204 generates this time series data in real-time, the connectivity analytics tracker 204 may transmit this time series data to the central analytics engine 214 implemented in the control plane through the AMF. Additionally, the connectivity analytics tracker 204 may provide the generated association patterns for the client devices 208 and associated with the RAN 202 to the mobility analytics tracker 206.

The mobility analytics tracker 206, as noted above, automatically generates, in real-time, time series patterns corresponding to the complete association patterns of client devices 208 with different RANs (including RAN 202) within a 5G cell. For instance, as client devices 208 roam into and out of the RAN 202, the mobility analytics tracker 206 may track each client device's mobility within the 5G mobile network. Based on this tracking of client device movements within the 5G mobile network, the mobility analytics tracker 206 may generate time series mobility patterns for each of these client devices 208. In some instances, the mobility analytics tracker 206 may further maintain dedicated graphs on a per-device basis to track the location of client devices 208 in relation to the RAN 202 topology. In some instances, the mobility analytics tracker 206 may further track the mobility metrics corresponding to client device movements within the 5G mobile network from the perspective of the RAN 202 itself. As the mobility analytics tracker 206 generates mobility patterns and other metrics on a per-device basis for the myriad client devices accessing the RAN 202 and other RANs within the 5G mobility network, the mobility analytics tracker 206 may automatically transmit these mobility patterns and other metrics to the central analytics engine 214.

Figure 3:
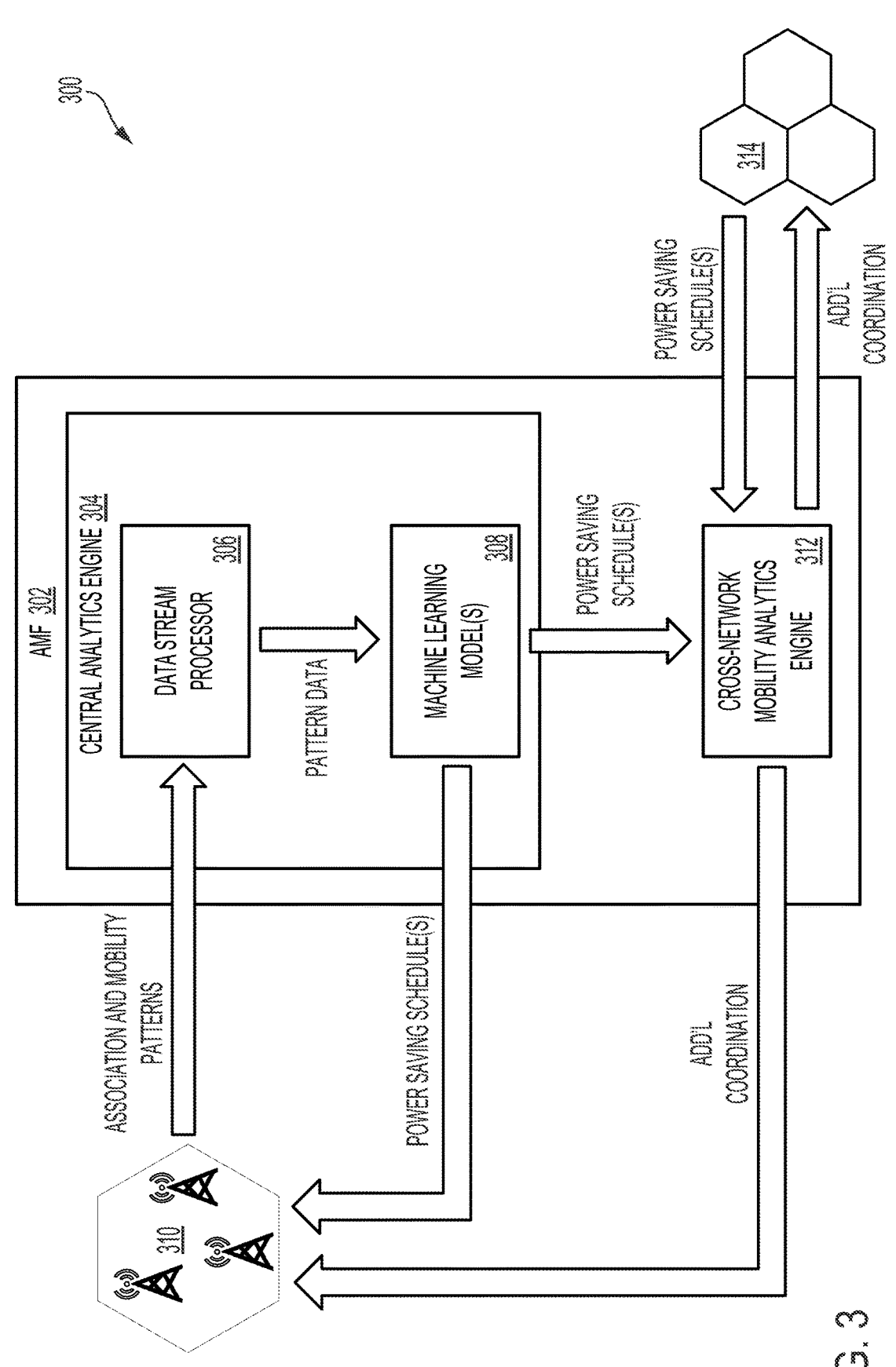
FIG. 3 shows an illustrative example of an environment in which a central analytics engine implemented by the AMF generates a set of power saving schedules for a set of 5G nodes within a corresponding 5G mobile network in accordance with at least one embodiment.

FIG. 3 shows an illustrative example of an environment 300 in which a central analytics engine 304 implemented by the AMF 302 generates a set of power saving schedules for a set of 5G nodes within a corresponding 5G mobile network in accordance with at least one embodiment. The AMF 302, central analytics engine 304, and cross-network mobility analytics engine 312 illustrated in FIG. 3 may be similar to the AMF 108, central analytics engine 110, and cross-network mobility analytics engine 112 described above in connection with FIG. 1. For instance, the AMF 302 may implement a central analytics engine 304, which may continuously, and in real-time, receive data streams from connectivity analytics trackers and mobility analytics trackers implemented by different RANs within a 5G cell 310. These data streams may include association and mobility patterns associated with different client devices roaming into and out of the 5G cell 310 over time. Further, the data streams from the different RANs may further include statistical data corresponding to the RANs themselves. This statistical data may include association patterns for each RAN, which may indicate how many client devices are associated with the RAN, the involvement of the RAN in the transmission of data corresponding to these client devices, the length of time for identified inactive periods for the RAN, and the like. Further, the statistical data may indicate, for each RAN, how many client devices have roamed out of range of the RAN, how many client devices roamed into range of the RAN, the transmission patterns during the roaming phase for these client devices, and the like.

In an embodiment, the central analytics engine 304 implements a data stream processor 306 that is configured to dynamically, and in real-time, process the data streams from the various RANs in the 5G cell 310. As noted above, the connectivity analytics trackers and mobility analytics trackers implemented by different RANs within a 5G cell 310 may continuously, and in real-time, transmit a data stream comprising the association and mobility patterns associated with different client devices to the central analytics engine 304. The data stream processor 306 may continuously process these data streams as they are received in order to parse the association and mobility patterns for the 5G cell 310 from the data streams. Further, the data stream processor 306 may continuously process the data streams as they are received to parse the statistical data corresponding to the different RANs in the 5G cell 310.

The data stream processor 306, in an embodiment, automatically transmits the parsed association and mobility patterns, as well as the statistical data corresponding to the different RANs in the 5G cell 310, to one or more machine learning models 308 for the creation of power saving schedules for these RANs. As noted above, the central analytics engine 304 may generate one or more machine learning models 308 for the KPIs that are being streamed from the different RANs in the 5G cell 310. These machine learning models 308 are dynamically trained in real-time by processing sample association and mobility patterns corresponding to different client devices and RANs according to one or more vectors of similarity between a sample dataset and other clusters corresponding to different power saving schedule types. The central analytics engine 304, through the one or more machine learning models 308, can perform such clustering and obtain partial matches among other clusters of association and mobility patterns to identify a particular cluster and, from this cluster, identify a power saving schedule that may be implemented for a corresponding RAN in the 5G cell 310.

The one or more machine learning models 308, using the parsed data from the data stream processor 306, may continuously compute power saving profiles for each of the RANs within the 5G cell 310. Based on these power saving profiles, the one or more machine learning models 308 may generate corresponding power saving schedules for each of the RANs in the 5G cell 310. The power saving schedules may indicate periods of time during which power consumption for each of the RANs may be reduced or otherwise shut down in order to optimize power consumption within the 5G cell 310 as a whole. As these power saving schedules are defined, the central analytics engine 304 may incrementally transmit these power saving schedules to the various RANs in the 5G cell 310 in order to reduce or prevent any network disruptions within the 5G cell 310 that may impact the client devices connected to the RANs. As new association and mobility patterns are received, these new association and mobility patterns may be used to evaluate the previously generated machine learning models 308 and to determine whether the machine learning models 308 should be updated to provide more accurate results.

As noted above, the AMF 302 may further implement a cross-network mobility analytics engine 312 that is configured to coordinate between central analytics engine components from other network providers and the central analytics engine 304 to further optimize power consumption for the 5G cell 310. These other network providers may implement other 5G cells 314 that provide overlapping network coverage with the 5G cell 310 for client devices. The cross-network mobility analytics engine 312 may communicate with different central analytics engines associated with private 5GaaS network providers and/or public 5G network providers.

The cross-network mobility analytics engine 312 may receive different power saving schedules generated by the different central analytics engines corresponding to the different overlapping 5G cells 314. As the cross-network mobility analytics engine 312 receives these power saving schedules, the cross-network mobility analytics engine 312 may correlate these power saving schedules with the roaming patterns of the client devices that are roaming between the different 5G cells 310, 314. For instance, the cross-network mobility analytics engine 312 may identify any overlapping RANs corresponding to the 5G cell 310 and the other 5G cells 314. For these overlapping RANs, the cross-network mobility analytics engine 312 may process their corresponding power saving schedules to identify any periods of time during which the RANs within the 5G cell 310 can remain powered down or at a reduced power consumption state as a result of overlapping RANs associated with different 5G cells 314 being able to service the client devices within range of the RANs within the 5G cell 310.

The coordination process performed by the cross-network mobility analytics engine 312 across the myriad 5G cells 310, 314 to optimize roaming in relation with overall power consumption across the corresponding 5G mobile networks. The cross-network mobility analytics engine 312, for instance, may share the roaming profiles corresponding to the RANs in the 5G cell 310 with the cross-network mobility analytics engines associated with the other 5G cells 314 such that roaming may be performed at a different time into another 5G mobile network if the resulting impact includes maintaining RANs within the 5G cells 310 in a reduced power or powered off state.

Figure 4:
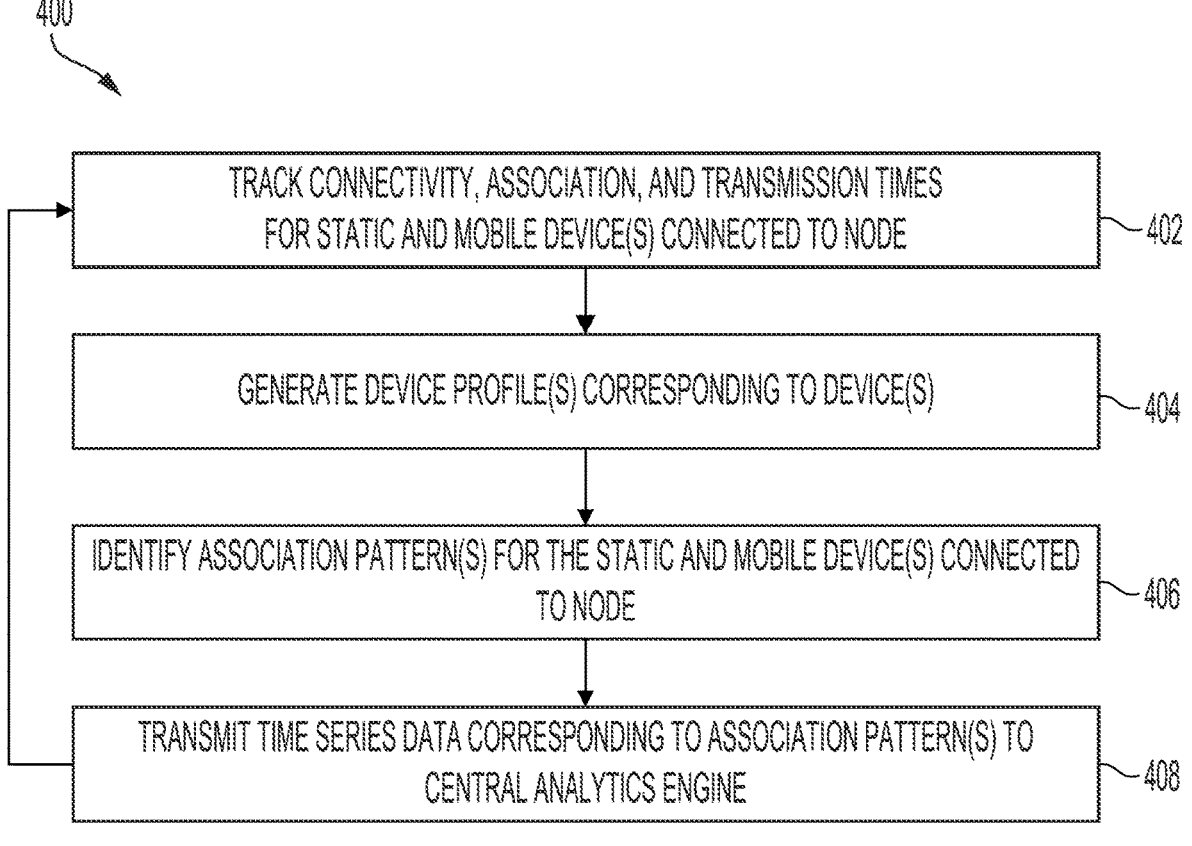
FIG. 4 shows an illustrative example of a process for generating time series data corresponding to association patterns for a set of client devices in accordance with at least one embodiment.

FIG. 4 shows an illustrative example of a process 400 for generating time series data corresponding to association patterns for a set of client devices in accordance with at least one embodiment. The process 400 may be performed by a connectivity analytics tracker implemented on a 5G node (e.g., a RAN) associated with an active 5G mobile network. As noted above, in some instances, the connectivity analytics tracker may be implemented as part of the AMF in the control plane for the 5G mobile network. If the connectivity analytics tracker is implemented as part of the AMF, the process 400 may include an additional operation, whereby the connectivity analytics tracker may continuously, and in real-time, obtain data streams from different RANs within the 5G mobile network to perform the operations illustrated in FIG. 4.

At step 402, the connectivity analytics tracker for a particular RAN may track connectivity, association, and transmission times for static and mobile devices connected to the RAN. For instance, the connectivity analytics tracker may use connectivity data associated with different client devices connecting to the corresponding RAN to generate a set of statistics for each client device. These statistics may correspond to the connectivity, association, and transmission times for each client device connecting to the RAN. Further, these statistics may serve to indicate, for each client device, how long the client device is transmitting through the corresponding RAN, how long the client device is associated with the RAN, and/or how long the client device remains associated with the RAN without being engaged in any activity.

At step 404, the connectivity analytics tracker may generate client device profiles corresponding to the different client devices (e.g., static and mobile devices) connected to the RAN. These client device profiles may include the aforementioned statistics and any correlations made with regard to a client device's association with the RAN over time. For instance, a client device profile may include time series data over extended periods of time for which the aforementioned statistics are recorded. The time series data may be used to identify any correlations or patterns corresponding to the client device's association with the RAN over these extended periods of time.

At step 406, the connectivity analytics tracker may process the various client device profiles corresponding to different client devices to identify any association patterns for these different client devices. For instance, the connectivity analytics tracker may automatically, and in real-time, process the statistics and corresponding time series data for a client device (as defined in the client device profile associated with the client device) to identify the correlations or patterns corresponding to the client device's associated with the RAN over time. These correlations or patterns may be defined as the association patterns for the client device.

At step 408, the connectivity analytics tracker may transmit time series data corresponding to the identified association patterns to the central analytics engine associated with the AMF in the control plane. As noted above, the connectivity analytics tracker may continuously track, in real-time, the aforementioned metrics for the client devices and the RAN to generate time series data over extended periods of time. As this time series data is generated, the connectivity analytics tracker may automatically transmit this time series data to the central analytics engine implemented by the AMF in the control plane. This may allow the central analytics engine to generate and/or update one or more machine learning models that are implemented to dynamically generate power saving schedules for the RANs within the 5G cell.

It should be noted that the process 400 may be continuously performed by the connectivity analytics tracker as client device interactions with the corresponding RAN occur. For instance, the connectivity analytics tracker may continuously, and in real-time, monitor client device interactions with the RAN to track the connectivity, association, and transmission times for these client devices. Thus, the various operations associated with the process 400 may be continuously performed by the connectivity analytics tracker as client devices continue to interact with the RAN.

Figure 5:
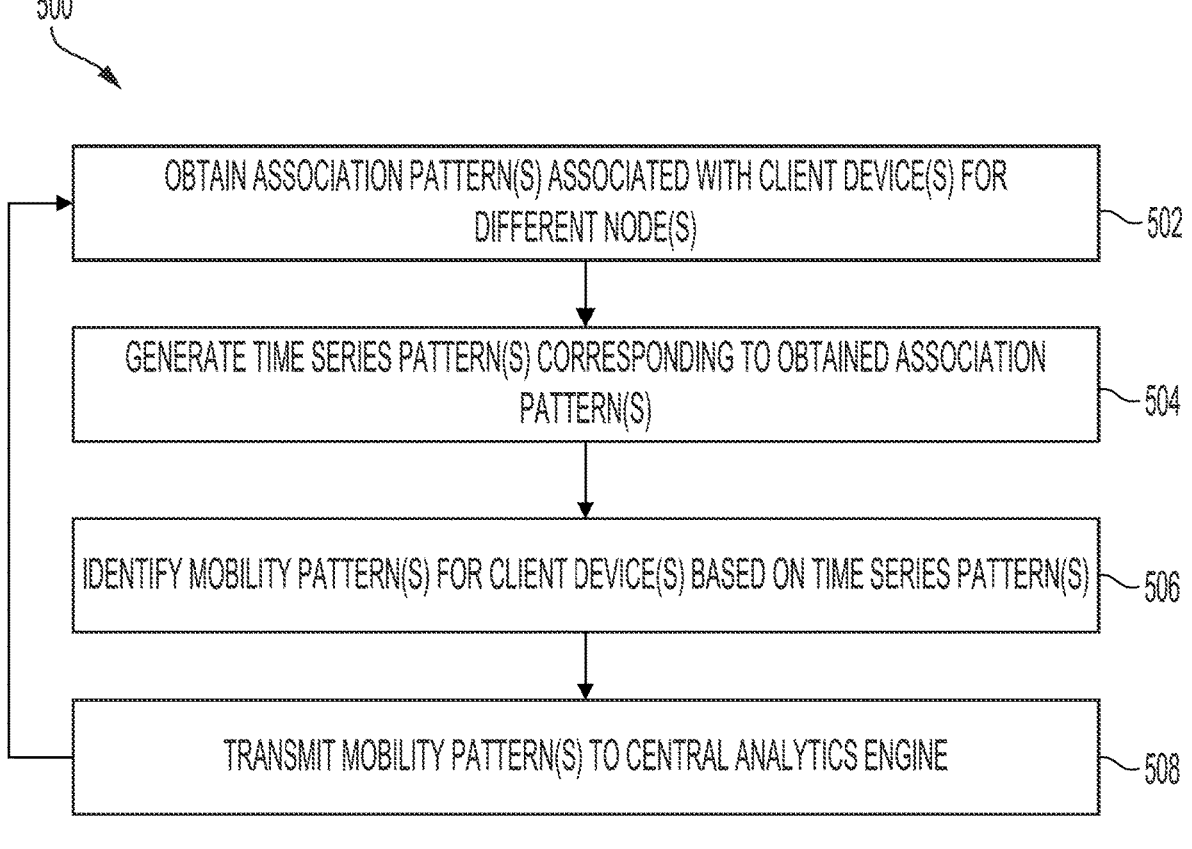
FIG. 5 shows an illustrative example of a process for identifying a set of mobility patterns for a set of client devices in accordance with at least one embodiment.

FIG. 5 shows an illustrative example of a process 500 for identifying a set of mobility patterns for a set of client devices in accordance with at least one embodiment. The process 500 may be performed by a mobility analytics tracker implemented on a 5G node (e.g., a RAN) associated with an active 5G mobile network. As noted above, in some instances, the mobility analytics tracker may be implemented as part of the AMF in the control plane for the 5G mobile network. If the mobility analytics tracker is implemented as part of the AMF, the process 500 may include an additional operation, whereby the mobility analytics tracker may continuously, and in real-time, obtain data streams from different RANs within the 5G mobile network to perform the operations illustrated in FIG. 5.

At step 502, the mobility analytics tracker may obtain association patterns associated with different client devices and corresponding to different RANs within the 5G cell. As noted above, the mobility analytics tracker may be implemented within a RAN or central analytics engine along with the aforementioned connectivity analytics tracker. The connectivity analytics tracker may dynamically generate, in real-time, association patterns corresponding to different client devices. The connectivity analytics tracker, in an embodiment, automatically provide the generated association patterns for the client devices and associated with the RAN to the mobility analytics tracker.

At step 504, the mobility analytics tracker may generate time series patterns corresponding to the obtained association patterns. For instance, the mobility analytics tracker may monitor handover events associated with the RAN and corresponding to different client devices roaming into and out of the RAN. Through these handover events, the mobility analytics tracker may track a client device's mobility within the 5G mobile network as the client device becomes associated and disassociated with the RAN. In some instances, the mobility analytics tracker may additionally maintain dedicated graphs on a per-device basis to track the location of client devices in relation to the RAN topology. The mobility analytics tracker may further track the mobility metrics corresponding to client device movements within the 5G mobile network from the perspective of the RAN itself. For example, the mobility analytics tracker may track how many client devices have roamed out of range of the RAN and into range of the RAN.

At step 506, the mobility analytics tracker may identify mobility patterns for different client devices based on the time series patterns. For instance, based on this tracking of client device movements within the 5G mobile network, the mobility analytics tracker may generate mobility patterns for each of these client devices. As the mobility analytics tracker generates mobility patterns and other metrics on a per-device basis for the myriad client devices accessing the RAN and other RANs within the 5G mobility network, the mobility analytics tracker, at step 508, may automatically transmit these mobility patterns and other metrics to the central analytics engine. This may allow the central analytics engine to generate and/or update one or more machine learning models that are implemented to dynamically generate power saving schedules for the RANs within the 5G cell.

It should be noted that the process 500 may be continuously performed by the mobility analytics tracker as client devices become associated with or disassociated from the corresponding RAN. For instance, the mobility analytics tracker may continuously, and in real-time, obtain association patterns associated with different client devices as these association patterns are identified and generated by the connectivity analytics tracker. Thus, the various operations associated with the process 500 may be continuously performed by the mobility analytics tracker as client devices continue to interact with the RAN and move within the 5G mobile network.

FIG. 6 shows an illustrative example of a process 600 for generating and communicating a set of power saving schedules for different 5G nodes based on received association and mobility patterns across a 5G mobile network in accordance with at least one embodiment. The process 600 may be performed by a central analytics engine implemented by the AMF in the control plane of a 5G mobile network. At step 602, the central analytics engine may receive association and mobility patterns associated with different RANs within a particular 5G cell. For instance, the central analytics engine may continuously, and in real-time, receive data streams from the connectivity analytics tracker and the mobility analytics tracker implemented by each RAN within the 5G cell. The central analytics engine may continuously process these data streams as they are received to extract the association and mobility patterns for the 5G cell and statistical data corresponding to different RANs from the data streams.

At step 604, the central analytics engine may generate and/or update one or more machine learning models corresponding to different KPIs associated with the obtained association and mobility patterns. These one or more machine learning models are dynamically trained in real-time by processing sample association and mobility patterns corresponding to different client devices and RANs according to one or more vectors of similarity between a sample dataset and other clusters corresponding to different power saving schedule types. The central analytics engine, through the one or more machine learning models, can perform such clustering and obtain partial matches among other clusters of association and mobility patterns to identify a particular cluster and, from this cluster, identify a power saving schedule that may be implemented for a corresponding RAN in the 5G cell. As new association and mobility patterns are obtained, these one or more machine learning models may be evaluated to determine whether the machine learning models should be updated to provide more accurate results.

At step 606, the central analytics engine may process the obtained association and mobility patterns through the one or more machine learning models to generate a set of power saving profiles for the RANs within the 5G cell. For instance, the central analytics engine, through the one or more machine learning models, may determine periods of time when a RAN is not servicing client devices and may be powered down or otherwise have its power consumption reduced. Further, through the one or more machine learning models, the central analytics engine may identify periods of time when a RAN can be powered down or otherwise have its power consumption reduced even when the RAN has a historical trend of servicing client devices. These periods of time may be identified according to historical roaming and association patterns that demonstrate the ability of neighboring RANs to service the same client devices. The central analytics engine, through the machine learning models, may further identify, for each RAN, any transmission frequencies that require more power consumption but for which other frequencies requiring less power consumption may be used to provide network connectivity for client devices within the 5G mobile network. This data generated through the one or more machine learning models may be used to dynamically define power saving profiles for each of the RANs within the 5G cell.

At step 608, the central analytics engine may generate power saving schedules for the RANs based on the power saving profiles corresponding to these RANs. The power saving schedules may indicate periods of time during which power consumption for each of the RANs may be reduced or otherwise shut down in order to optimize power consumption within the 5G cell as a whole. The central analytics engine may process the power saving profiles for each of the RANs through the one or more machine learning models according to one or more vectors of similarity associated with clusters corresponding to different power saving schedule types. The central analytics engine, through the one or more machine learning models, can perform such clustering and obtain partial matches among clusters of association and mobility patterns to identify a particular cluster and, from this cluster, identify a power saving schedule that may be implemented for a corresponding RAN in the 5G cell.

At step 610, the central analytics engine may incrementally communicate these power saving schedules to the corresponding RANs within the 5G cell. These power saving schedules may be incrementally communicated to the RANs within the 5G cell over time in order to reduce or prevent any network disruptions within the 5G cell that may impact the client devices connected to the RANs.

It should be noted that the central analytics engine may continuously perform the process 600 as new association and mobility patterns are obtained. For instance, as new association and mobility patterns are received, the central analytics engine may process these new association and mobility patterns to detect any changes that, in turn, may result in changes to the power saving profiles and corresponding schedules for the RANs. Thus, as new association and mobility patterns are received, these new association and mobility patterns may be used to evaluate the previously generated machine learning models and to determine whether the machine learning models should be updated to provide more accurate results. For instance, if a previously generated set of power saving schedules did not result in reduced power consumption for a 5G cell as a whole, the machine learning models may be updated using the new association and mobility patterns to perform a re-clustering of these machine learning models and/or an update to the corresponding vectors of similarity in order to more accurately define power saving schedules for the RANs.

Figure 7:
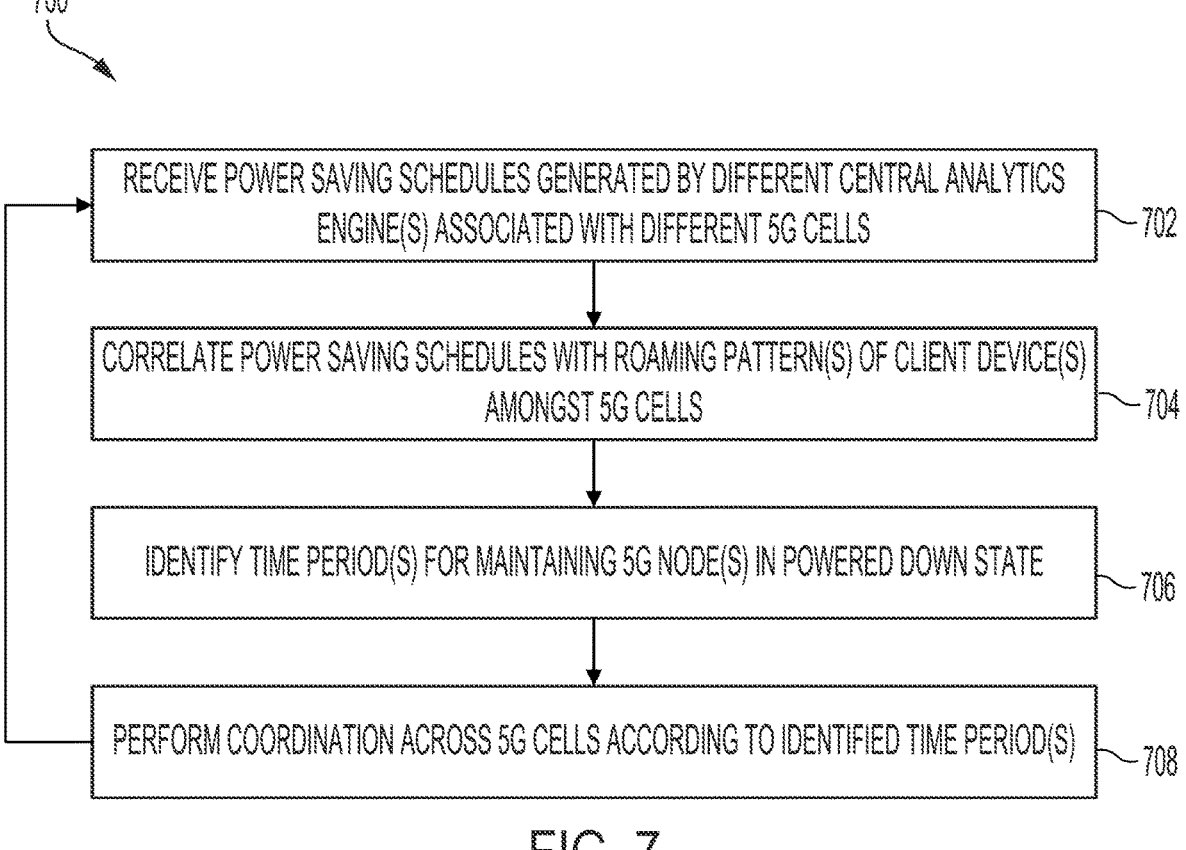
FIG. 7 shows an illustrative example of a process for coordinating powered down states for different 5G nodes within different 5G mobile networks based on power saving schedules previously defined for the 5G nodes in accordance with at least one embodiment.

FIG. 7 shows an illustrative example of a process 700 for coordinating powered down states for different 5G nodes within different 5G mobile networks based on power saving schedules previously defined for the 5G nodes in accordance with at least one embodiment. The process 700 may be performed by a cross-network mobility analytics engine implemented by the AMF in the control plane of a 5G mobile network. At step 702, the cross-network mobility analytics engine may receive power saving schedules generated by different central analytics engines associated with different 5G cells and/or different 5G mobile network providers. These other network providers may implement other 5G cells that provide overlapping network coverage with the 5G cell associated with the AMF that implements the cross-network mobility analytics engine. In some instances, the cross-network mobility analytics engine may communicate with different central analytics engines associated with private 5GaaS network providers and/or public 5G network providers to obtain these power saving schedules.

At step 704, the cross-network mobility analytics engine may correlate the power saving schedules from the different 5G cells and/or different 5G mobile network providers with roaming patterns of the client devices amongst these different 5G cells. For example, the cross-network mobility analytics engine may identify any overlapping RANs corresponding to the different 5G cells. For these overlapping RANs, the cross-network mobility analytics engine may process their corresponding power saving schedules to identify, at step 706, any periods of time during which the RANs within the 5G cell corresponding to the AMF implementing cross-network mobility analytics engine can remain powered down or at a reduced power consumption state as a result of overlapping RANs associated with different 5G cells being able to service the client devices within range of the RANs within the 5G cell.

At step 708, the cross-network mobility analytics engine may perform coordination across the different 5G cells corresponding to its own AMF and to other 5G mobile network providers according to the identified periods of time. This coordination process may be performed by the cross-network mobility analytics engine across the myriad 5G cells to optimize roaming in relation with overall power consumption across the corresponding 5G mobile networks. The cross-network mobility analytics engine, for instance, may share the roaming profiles corresponding to the RANs in the 5G cell with the cross-network mobility analytics engines associated with the other 5G cells such that roaming may be performed at a different time into another 5G mobile network if the resulting impact includes maintaining RANs within the 5G cells in a reduced power or powered off state.

It should be noted that the cross-network mobility analytics engine may continuously perform the process 700 as power saving schedules are obtained. For instance, the cross-network mobility analytics engine may continuously, and in real-time, obtain power saving schedules associated with different RANs and corresponding 5G cells as these power saving schedules are generated by the myriad central analytics engines associated with these 5G cells. Thus, the various operations associated with the process 700 may be continuously performed by the cross-network mobility analytics engine as client devices continue to interact with different RANs and move within different 5G cells and 5G mobile networks.

FIG. 8 illustrates an example network device 800 suitable for performing switching, routing, and other networking operations in accordance with some implementations. Network device 800 includes a CPU 804, interfaces 802, and a connection 810 (e.g., a Peripheral Component Interconnect (PCI) bus). When acting under the control of appropriate software or firmware, the CPU 804 is responsible for executing packet management, error detection, and/or routing functions. The CPU 804 can accomplish these functions under the control of software including an operating system and any appropriate applications software. The CPU 804 may include one or more processors 808, such as a processor from the Intel® X98 family of microprocessors. In some cases, the processor 808 can be specially designed hardware for controlling the operations of network device 800. In some cases, a memory 806 (e.g., non-volatile RAM, ROM, etc.) also forms part of the CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 including various components in electrical communication with each other using a connection 906, such as a bus, in accordance with some implementations. Example system architecture 900 includes a processing unit (CPU or processor) 904 and a system connection 906 that couples various system components including the system memory 920, such as ROM 918 and RAM 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, RAMs 916, ROM 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:
continuously monitoring association patterns corresponding to a set of client devices within a 5G network, wherein the 5G network includes a set of 5G nodes, and wherein the association patterns denote changes to associations between the set of client devices and the set of 5G nodes;
tracking mobility patterns in the 5G network across the set of 5G nodes and the set of client devices, wherein the mobility patterns are tracked based on the association patterns;
dynamically training a machine learning model to identify periods of time for powering down one or more 5G nodes of the set of 5G nodes, wherein the machine learning model is dynamically trained based on historical telemetry data associated with the 5G network;
generating a set of power saving profiles for the set of 5G nodes, wherein the set of power saving profiles are generated using the association patterns and the mobility patterns as input to the machine learning model;
automatically defining power saving modes for the set of 5G nodes, wherein the power saving modes are implemented according to the set of power saving profiles; and
updating the machine learning model according to changes to the association patterns and the mobility patterns resulting from the power saving modes.

2. The computer-implemented method of claim 1, further comprising:
generating a set of profiles corresponding to the set of client devices, wherein the set of profiles are generated based on the association patterns; and
updating the historical telemetry data to include the set of profiles to dynamically train the machine learning model.

3. The computer-implemented method of claim 1, wherein the mobility patterns include time series patterns that track different association patterns corresponding to a client device with different 5G nodes within the 5G network.

4. The computer-implemented method of claim 1, further comprising:
receiving a set of power saving schedules associated with one or more other 5G networks, wherein the one or more other 5G networks provide overlapping network coverage with the 5G network; and
determining time periods during which a subset of the set of 5G nodes are powered down and serviced by the one or more other 5G networks.

5. The computer-implemented method of claim 1, further comprising:
reducing power consumption for a set of higher transmit power frequencies as a result of a determination that the set of client devices can remain connected to the 5G network through a set of lower transmit power frequencies, wherein the determination is generated based on the association patterns and the mobility patterns.

6. The computer-implemented method of claim 1, wherein the set of power saving profiles define period of time when the set of 5G nodes are not servicing any client devices and can be powered down.

7. The computer-implemented method of claim 1, wherein automatically defining the power saving modes for the set of 5G nodes includes:
generating schedules for the set of 5G nodes to enter the power saving modes; and
incrementally communicating the schedules to the set of 5G nodes, wherein the schedules are incrementally communicated to limit network disruption amongst the set of client devices.

8. A system, comprising:
one or more processors; and
memory storing thereon instructions that, as a result of being executed by the one or more processors, cause the system to:
continuously monitor association patterns corresponding to a set of client devices within a 5G network, wherein the 5G network includes a set of 5G nodes, and wherein the association patterns denote changes to associations between the set of client devices and the set of 5G nodes;
track mobility patterns in the 5G network across the set of 5G nodes and the set of client devices, wherein the mobility patterns are tracked based on the association patterns;
dynamically train a machine learning model to identify periods of time for powering down one or more 5G nodes of the set of 5G nodes, wherein the machine learning model is dynamically trained based on historical telemetry data associated with the 5G network;
generate a set of power saving profiles for the set of 5G nodes, wherein the set of power saving profiles are generated using the association patterns and the mobility patterns as input to the machine learning model;
automatically define power saving modes for the set of 5G nodes, wherein the power saving modes are implemented according to the set of power saving profiles; and
update the machine learning model according to changes to the association patterns and the mobility patterns resulting from the power saving modes.

9. The system of claim 8, wherein the instructions further cause the system to:

generate a set of profiles corresponding to the set of client devices, wherein the set of profiles are generated based on the association patterns; and update the historical telemetry data to include the set of profiles to dynamically train the machine learning model.

10. The system of claim 8, wherein the mobility patterns include time series patterns that track different association patterns corresponding to a client device with different 5G nodes within the 5G network.

11. The system of claim 8, wherein the instructions further cause the system to:

receive a set of power saving schedules associated with one or more other 5G networks, wherein the one or more other 5G networks provide overlapping network coverage with the 5G network; and determine time periods during which a subset of the set of 5G nodes are powered down and serviced by the one or more other 5G networks.

12. The system of claim 8, wherein the instructions further cause the system to:

reduce power consumption for a set of higher transmit power frequencies as a result of a determination that the set of client devices can remain connected to the 5G network through a set of lower transmit power frequencies, wherein the determination is generated based on the association patterns and the mobility patterns.

13. The system of claim 8, wherein the set of power saving profiles define period of time when the set of 5G nodes are not servicing any client devices and can be powered down.

14. The system of claim 8, wherein the instructions that cause the system to automatically define the power saving modes for the set of 5G nodes further cause the system to:

generate schedules for the set of 5G nodes to enter the power saving modes; and incrementally communicate the schedules to the set of 5G nodes, wherein the schedules are incrementally communicated to limit network disruption amongst the set of client devices.

15. A non-transitory, computer-readable storage medium storing thereon executable instructions that, as a result of being executed by one or more processors of a computer system, cause the computer system to:

continuously monitor association patterns corresponding to a set of client devices within a 5G network, wherein the 5G network includes a set of 5G nodes, and wherein the association patterns denote changes to associations between the set of client devices and the set of 5G nodes;

track mobility patterns in the 5G network across the set of 5G nodes and the set of client devices, wherein the mobility patterns are tracked based on the association patterns;

dynamically train a machine learning model to identify periods of time for powering down one or more 5G nodes of the set of 5G nodes, wherein the machine learning model is dynamically trained based on historical telemetry data associated with the 5G network;

generate a set of power saving profiles for the set of 5G nodes, wherein the set of power saving profiles are generated using the association patterns and the mobility patterns as input to the machine learning model;

automatically define power saving modes for the set of 5G nodes, wherein the power saving modes are implemented according to the set of power saving profiles; and update the machine learning model according to changes to the association patterns and the mobility patterns resulting from the power saving modes.

16. The non-transitory, computer-readable storage medium of claim 15, wherein the executable instructions further cause the computer system to:

generate a set of profiles corresponding to the set of client devices, wherein the set of profiles are generated based on the association patterns; and update the historical telemetry data to include the set of profiles to dynamically train the machine learning model.

17. The non-transitory, computer-readable storage medium of claim 15, wherein the mobility patterns include time series patterns that track different association patterns corresponding to a client device with different 5G nodes within the 5G network.

18. The non-transitory, computer-readable storage medium of claim 15, wherein the executable instructions further cause the computer system to:

receive a set of power saving schedules associated with one or more other 5G networks, wherein the one or more other 5G networks provide overlapping network coverage with the 5G network; and determine time periods during which a subset of the set of 5G nodes are powered down and serviced by the one or more other 5G networks.

19. The non-transitory, computer-readable storage medium of claim 15, wherein the executable instructions further cause the computer system to:

reduce power consumption for a set of higher transmit power frequencies as a result of a determination that the set of client devices can remain connected to the 5G network through a set of lower transmit power frequencies, wherein the determination is generated based on the association patterns and the mobility patterns.

20. The non-transitory, computer-readable storage medium of claim 15, wherein the executable instructions that cause the computer system to automatically define the power saving modes for the set of 5G nodes further cause the computer system to:

generate schedules for the set of 5G nodes to enter the power saving modes; and incrementally communicate the schedules to the set of 5G nodes, wherein the schedules are incrementally communicated to limit network disruption amongst the set of client devices.

* * * * *